UNITED STATES PATENT OFFICE.

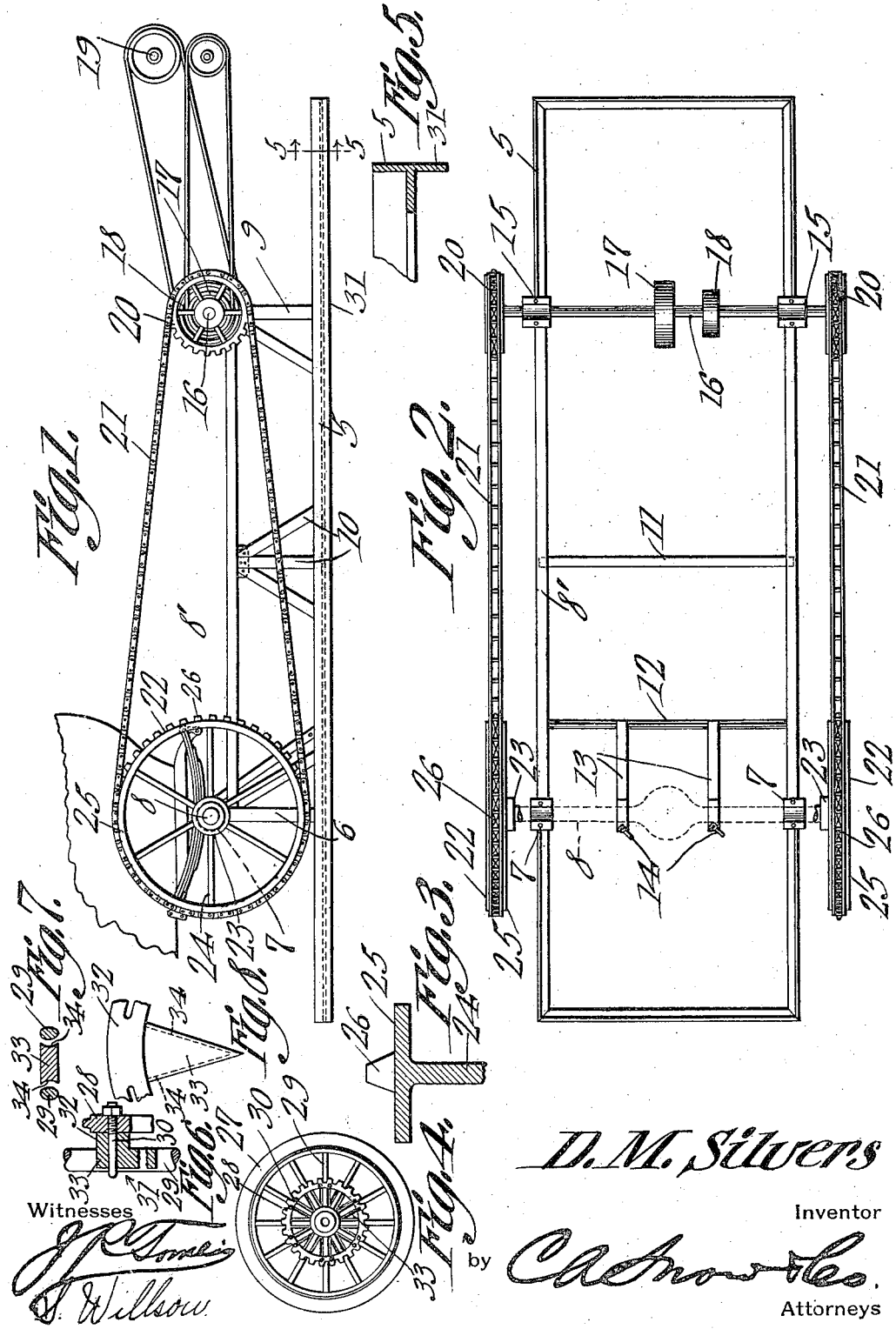

DEVELVES M. SILVERS, OF REA, MISSOURI.

POWER-TRANSMISSION DEVICE.

1,168,119.

Specification of Letters Patent.  Patented Jan. 11, 1916.

Application filed June 22, 1914. Serial No. 846,680.

*To all whom it may concern:*

Be it known that I, DEVELVES M. SILVERS, a citizen of the United States, residing at Rea, in the county of Andrew and State of Missouri, have invented a new and useful Power-Transmission Device, of which the following is a specification.

This invention relates to improvements in power transmitting devices and more particularly to a mechanism for deriving and transmitting power from an automobile.

One object of the present invention is to provide a mechanism to which an automobile may be readily secured, and capable of deriving power from the rear wheels of the vehicle, suitable sprocket wheels and chains being provided therefor.

A further object is to provide a wheel for a motor vehicle which may be used in the capacity of the usual wheel and which at the same time is provided with outstanding teeth adapted to drive a chain for the power operation of a shaft upon the mechanism.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof the preferred embodiment of my invention is illustrated, in which :—

Figure 1 is a side view in elevation of the power transmitting mechanism, showing the rear portion of an automobile secured thereto. Fig. 2 is a top plan view of the foregoing with the rear axle and wheels of the vehicle positioned thereon. Fig. 3 is a fragmental view of the construction of the driving wheel which is attached to the automobile. Fig. 4 is a view in elevation of a somewhat modified form of rear wheel to be used in connection with the power transmitting mechanism. Fig. 5 is a detail view of one of the longitudinal members of the base frame, illustrating the flanged construction thereof, whereby the frame is held in a stationary manner. Fig. 6 is a fragmental view in section illustrating the manner in which the sprocket wheel illustrated in Fig. 4 is secured to the vehicle wheel. Fig. 7 is a cross sectional view taken through two adjacent spokes and illustrating the convexity of the holding lugs with which the sprocket wheel is equipped. Fig. 8 is an enlarged view of the member employed in Fig. 6 to hold the sprocket wheel to the spokes and whereby power is transmitted therethrough.

Referring to the drawings in which similar reference numerals designate corresponding parts throughout the several views, a frame 5 is formed of suitable longitudinal and transverse beams, and is so secured and braced (not shown) that it forms a rigid structure. The longitudinal beams of the frame 5 are substantially T-shaped as illustrated in Fig. 5. The outer and depending flange 31 in addition to presenting a smooth surface is adapted to engage the ground and thus promote the stability of the structure and preventing its creeping even though the vibrations of the frame become excessive.

Rigidly secured to the base frame 5 are the upstanding posts 6 which are provided with the cradles 7 at their upper extremities adapted to receive the rear axle 8 of an automobile therein and to provide a support therefor. A pair of top beams 8' extend along the sides of the base frame and are held thereabove by the posts 9 and intermediate braces 10. The top frame is also provided with the transverse bars 11 and 12 which aid in holding the top frame rigid. Extending rearwardly from the cross beam 12 are the clamping arms 13 provided with the clips 14 at their rear extremities which are adapted to rigidly engage, at spaced points, the rear axle 8 of the vehicle.

Suitable bearings 15 are carried at the front extremity of the top frame and rotatably mount the power shaft 16 therein. The said shaft is provided with the driving pulley wheels 17 and 18, which are of different sizes so as to impart various speeds of rotation to power utilizing devices such as illustrated at 19 in Fig. 1, but which has been omitted in Fig. 2. The extremities of the driving shaft 16 are provided with the sprocket gears 20 over which the chains 21 extend.

The wheels 22 include the somewhat elongated hubs 23 which bring the wheels into proper alinement with the sprocket wheels 20 which are spread a distance apart slightly greater than the tread of the usual back wheels of an automobile for reasons which will be presently set forth at more length.

Each wheel 22 includes as illustrated in Fig. 3, the spokes 24 which carry the wide flat rim 25. Outstanding teeth 26 are arranged around and central of the rim 25 thus constituting a sprocket wheel and at the same time allowing the wheel to be used to propel and support the vehicle. The rear wheels 22 are thus suitable for driving the vehicles around a farm or similar locality where there is considerable demand for power. In using the wheels 22, it will of course be understood that the usual rear wheels of the vehicle are first removed and the wheels 22 rigidly secured to the rear axle.

The modified form of rear wheel and sprocket construction illustrated in Figs. 4, 6, 7 and 8 comprehends a structure which will not necessitate that the rear wheels of the vehicle be removed and replaced. With this in view, the member 31 is provided, the same consisting of a ring 32 and a plurality of outstanding V-shaped lugs 33. The said lugs are provided with convex edges as at 34 in Fig. 7, which are adapted to contact with the spokes 29 of the wheel 27. A plurality of U-shaped bolts 30, extend through suitable apertures in the holding member 31 and through the sprocket wheel 28. The apertures in the sprocket wheel 28 are in the form of slots as is also the case with the apertures in the holding member, so that the holding member may shift to bring one of the convex edges 34 into contact with the spoke, so that the power will be transmitted from the spokes to the holding members and to the sprocket wheel, thus preventing undue stress being brought to bear upon the bolts. The sprocket wheel extends away from the spokes a suitable distance so as to prevent the chains 21 from interfering with the tire or rim. Thus power will be transmitted from the rear axle 8 to the power shaft 16 from which it may be utilized as required. In mounting the rear axle within the cradles 7 a jack is employed, the rear axle being raised a slight distance above the cradle after which the vehicle is moved slightly rearwardly, resulting in the jack tending to overturn and in which action the axle will be lowered into the cradles 7 provided for its reception. In a similar manner, the vehicle is raised out of the cradles and lowered to the ground. It will be readily appreciated that a number of different pulley wheels may be mounted on the drive shaft 16 according to the class of service with which the present mechanism is to be utilized.

Having thus fully described my invention, what I claim to be new and original and desire to secure by Letters Patent is:—

1. The combination with a lower frame, an upper frame supported thereby and having spaced bearings, a driven shaft supported by the upper frame, of a motor vehicle having its rear axle supported by said spaced bearings on the upper frame, means for transmitting motion from the wheels on the rear axle of the vehicle to the driven shaft, braces fixed relative to the lower frame and inclined upwardly relative to the axle for holding said axle against movement toward the driven shaft, clips upon said braces and embracing the axle at opposite sides of the center thereof and between the spaced bearings.

2. The combination with a frame and a driven shaft journaled thereon, spaced bearings upon the frame, of a motor vehicle including a rear axle and supporting wheels upon the axle, said axle being mounted on the spaced bearings, the wheels of the vehicle being arranged beyond the sides of the frame and bearings, a ring at the outer side of each of said wheels, segmental members back of and integral with the ring and fitted between the spokes of the adjacent wheel, said ring having slots extending across the spokes, bolts straddling the spokes and secured within the slots, a sprocket engaging said bolts and held thereby against the ring, and chains for transmitting motion from the sprockets to the driven shaft.

In testimony that I claim the foregoing as my own, I have hereto affixed my signature in the presence of two witnesses.

DEVELVES M. SILVERS.

Witnesses:
 IRA A. MORRIS,
 THOMAS J. SHEPHERD.

Copies of this patent may be obtained for five cents each, by addressing the "Commissioner of Patents, Washington, D. C."